UNITED STATES PATENT OFFICE.

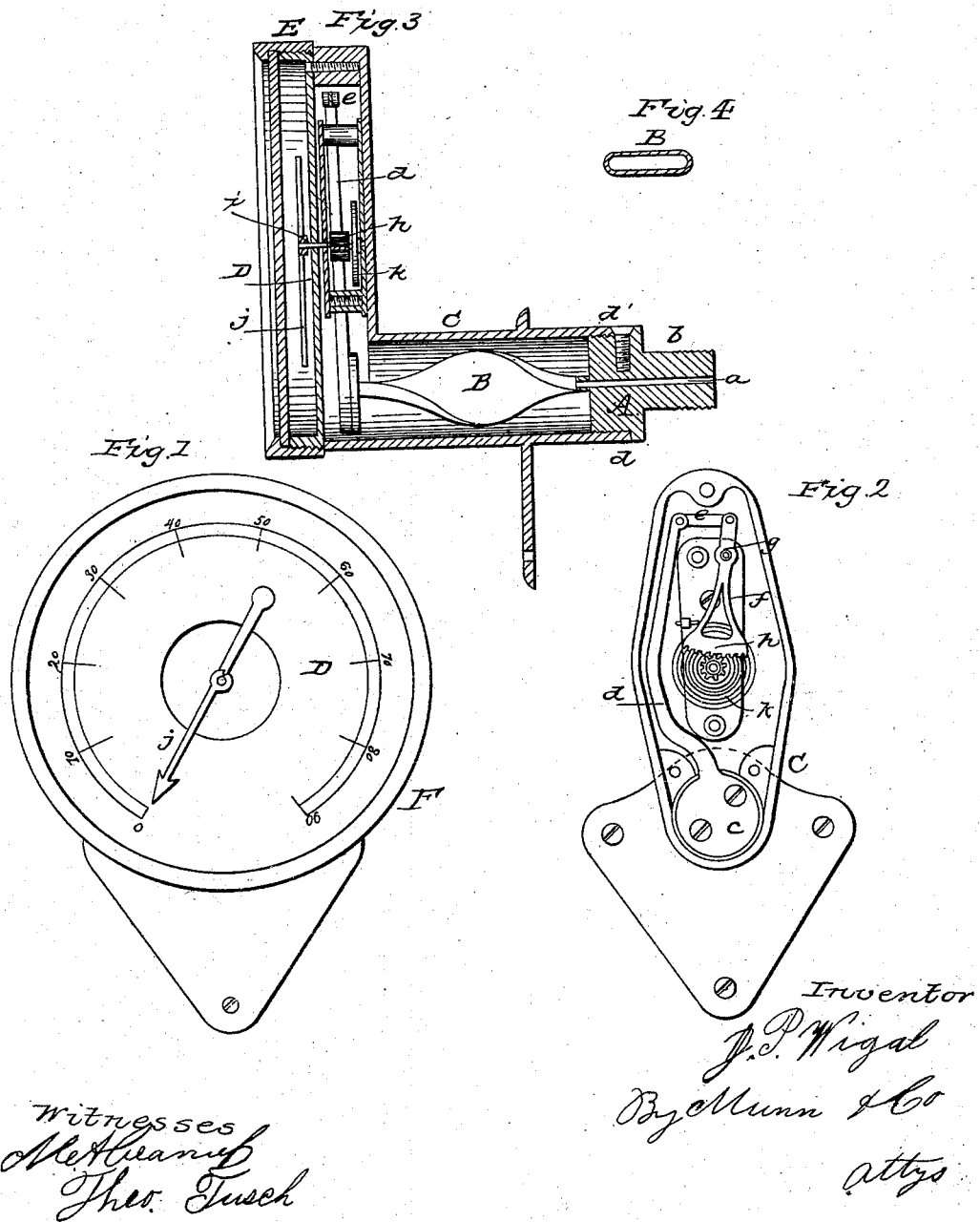

JAMES P. WIGAL, OF NEOGA, ILLINOIS.

IMPROVEMENT IN STEAM-PRESSURE GAGES.

Specification forming part of Letters Patent No. 48,331, dated June 20, 1865.

*To all whom it may concern:*

Be it known that I, JAMES P. WIGAL, of Neoga, in the county of Cumberland and State of Illinois, have invented a new and Improved Steam-Gage; and I do hereby declare that the following is a full, clear, and exact description thereof, which will enable those skilled in the art to make and use the same, reference being had to the accompanying drawings, forming part of this specification, in which—

Figure 1 represents a face view of this invention. Fig. 2 is a similar view of the same when the dial-plate is removed so as to expose the internal mechanism. Fig. 3 is a sectional side elevation of the same. Fig. 4 is a transverse section of the spiral tube.

Similar letters of reference indicate corresponding parts.

The operation of this steam-gage is based on the property of a flat-coiled tube, whereby the same when closed at one end and charged with fluid under pressure will slightly uncoil, and as soon as the pressure on the fluid ceases it (the tube) returns to its original position. By attaching to the closed end of the coiled tube a long arm which connects, by means of a toothed segment and pinion, with a central arbor carrying an index-hand, the slight motion which said tube assumes when exposed to the action of fluid under pressure is multiplied to produce the requisite motion of the index-hand, and a scale is obtained on the dial-plate sufficiently open to distinguish slight changes in the pressure of the fluid.

A represents a plug of brass or other metal perforated with a central hole, $a$, and provided with a screw-thread, $b$, so that it can be readily attached to a steam-generator or to a pipe connecting with the steam-space of said generator. A hole, $a$, communicates with the interior of a flat-coiled tube, B, which is firmly secured to said plug, as shown in Fig. 3 of the drawings. A cross-section of the tube B is shown in Fig. 4. It is made of thin sheet metal and coiled like an auger. Its outer end is closed by a disk, $c$, which is soldered to it, and it is covered up by a case, C, that is secured by a screw-thread, $d'$, or by any other suitable means to the plug A.

From the disk $c$ extends an arm, $d$, the outer end of which connects by a link, $e$, with the tail of a toothed segment, $f$. This segment has its bearing on a stud, $g$, rising from the back of the case C, and it gears in a pinion, $h$, mounted on the central arbor, $i$. Said arbor extends through a dial-plate, D, which covers the case C, and secured to its outer end is the index-hand $j$. A spiral spring, $k$, secured to the arbor $i$, causes the teeth of the pinion to bear always on the same side of the teeth of the segment and prevent a loss of motion in the gear.

The dial-plate and index-hand are protected by a cover, E, with a transparent head through which the position of said index-hand can be observed at any moment.

The dial-plate is marked with a suitable scale, by means of which the number of pounds pressure acting on the coiled tube can be determined.

When steam or other fluid under pressure is let into the coiled tube B it slightly uncoils and the index moves on the dial-plate and indicates the pressure in pounds to the square inch.

By the proportion of the arm $d$, segment $f$, and pinion $h$ the motion of the index-hand can be multiplied to such an extent that an open scale is obtained on the dial, and the slightest changes in the pressure can be determined without difficulty.

I claim as new and desire to secure by Letters Patent—

The coiled auger-shaped tube B, in combination with the plug A, arm $d$, segment $f$, pinion $h$, and index $i$, constructed and operating substantially as and for the purpose set forth.

JAMES P. WIGAL.

Witnesses:
WM. WIGAL,
F. M. WIGAL.